(12) United States Patent
Utsunomiya et al.

(10) Patent No.: US 7,834,497 B2
(45) Date of Patent: Nov. 16, 2010

(54) STARTER

(75) Inventors: Yamato Utsunomiya, Kariya (JP);
Kazuhiro Andoh, Okazaki (JP);
Tadahiro Kurasawa, Chita-gun (JP)

(73) Assignee: Denso Corporation, Kariya (JP)

( * ) Notice: Subject to any disclaimer, the term of this patent is extended or adjusted under 35 U.S.C. 154(b) by 424 days.

(21) Appl. No.: 11/902,885

(22) Filed: Sep. 26, 2007

(65) Prior Publication Data

US 2008/0084129 A1 Apr. 10, 2008

(30) Foreign Application Priority Data

Oct. 5, 2006 (JP) .............................. 2006-274168

(51) Int. Cl.
*H02K 1/00* (2006.01)

(52) U.S. Cl. ...................... 310/71; 290/38 R

(58) Field of Classification Search ................... 310/71, 310/89, 238–249, 68 A; 290/38 R, 48
See application file for complete search history.

(56) References Cited

U.S. PATENT DOCUMENTS

| | | | | |
|---|---|---|---|---|
| 2,774,894 A | * | 12/1956 | Antonidis et al. ............. | 310/71 |
| 4,897,571 A | * | 1/1990 | Isozumi ...................... | 310/239 |
| 4,954,733 A | * | 9/1990 | Isozumi ........................ | 310/71 |
| 5,065,039 A | * | 11/1991 | Isozumi et al. ................. | 290/48 |
| 5,086,244 A | * | 2/1992 | Isozumi ....................... | 310/89 |
| 5,494,010 A | * | 2/1996 | Niimi et al. ............. | 123/179.25 |
| 5,679,935 A | * | 10/1997 | Baba et al. ................. | 200/17 R |
| 6,076,412 A | * | 6/2000 | Nara et al. ....................... | 74/6 |
| 6,404,310 B1 | | 6/2002 | Ando et al. | |
| 7,626,280 B2 | * | 12/2009 | Kurasawa et al. ......... | 290/38 R |

FOREIGN PATENT DOCUMENTS

| | | |
|---|---|---|
| JP | A 2001-155609 | 6/2001 |
| JP | B2 3478211 | 10/2003 |
| JP | A 2006-195586 | 7/2006 |

OTHER PUBLICATIONS

Kurasawa et al., U.S. Appl. No. 11/879,511, filed Jul. 18, 2007.

* cited by examiner

*Primary Examiner*—Dang D Le
(74) *Attorney, Agent, or Firm*—Oliff & Berridge, PLC

(57) ABSTRACT

In a starter, a grommet attached to a yoke of a motor supports a motor terminal plate made of metal. The motor terminal plate is inserted in a penetration hole formed in the grommet. A pig-tail of a positive electrode brush is connected to one end of the M terminal plate projecting toward the inside of the yoke through the penetration hole. The other end of the M terminal plate projecting toward the outside of the yoke through the penetration hole is inserted into the inside of the resin cover through an insert groove formed in the resin cover of the electromagnetic switch. The M terminal plate is positioned in the grommet in the insert direction thereof to limit the movement of the M terminal plate toward the electromagnetic switch side and the motor side. This configuration provides a stable position of the M contact against the resin cover.

7 Claims, 6 Drawing Sheets

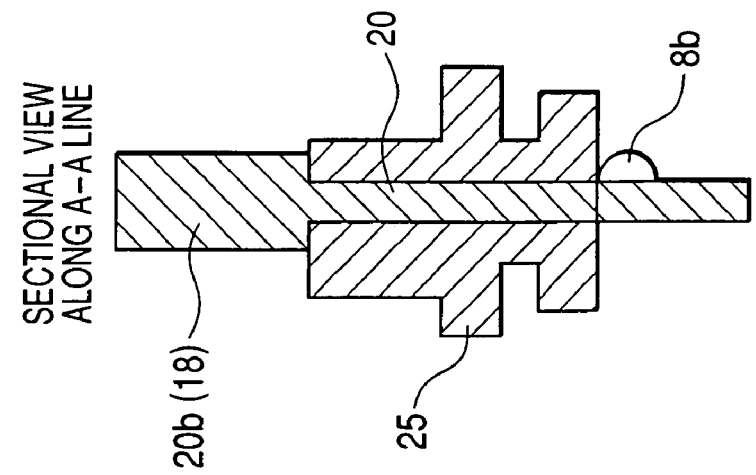
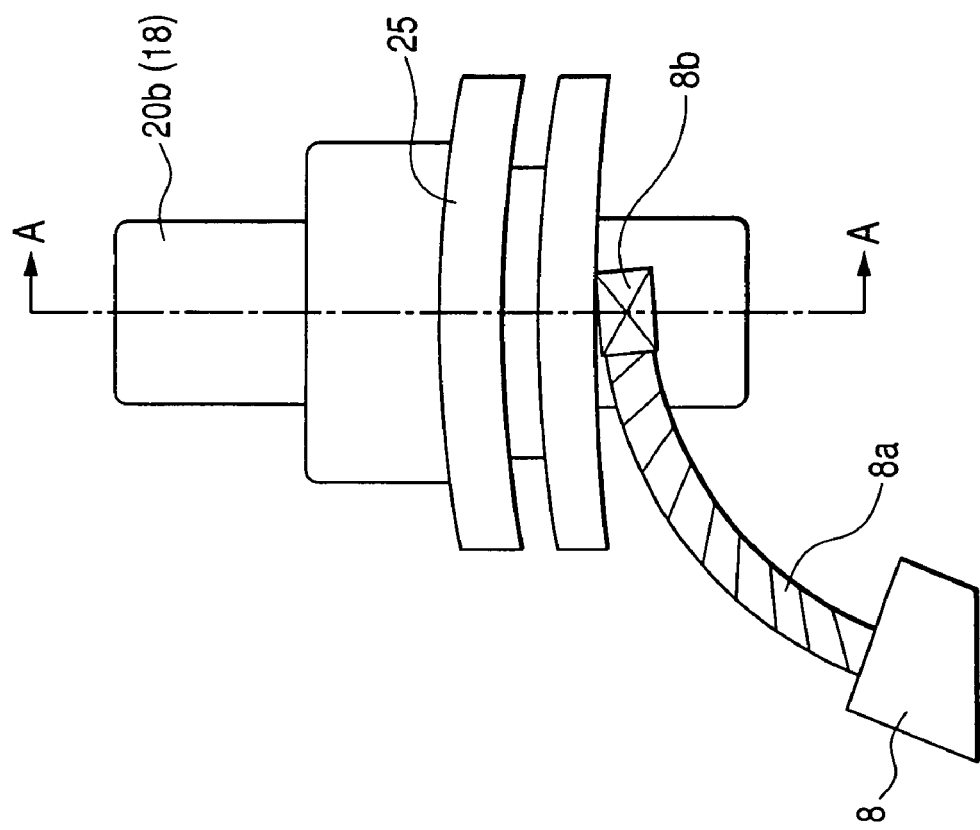

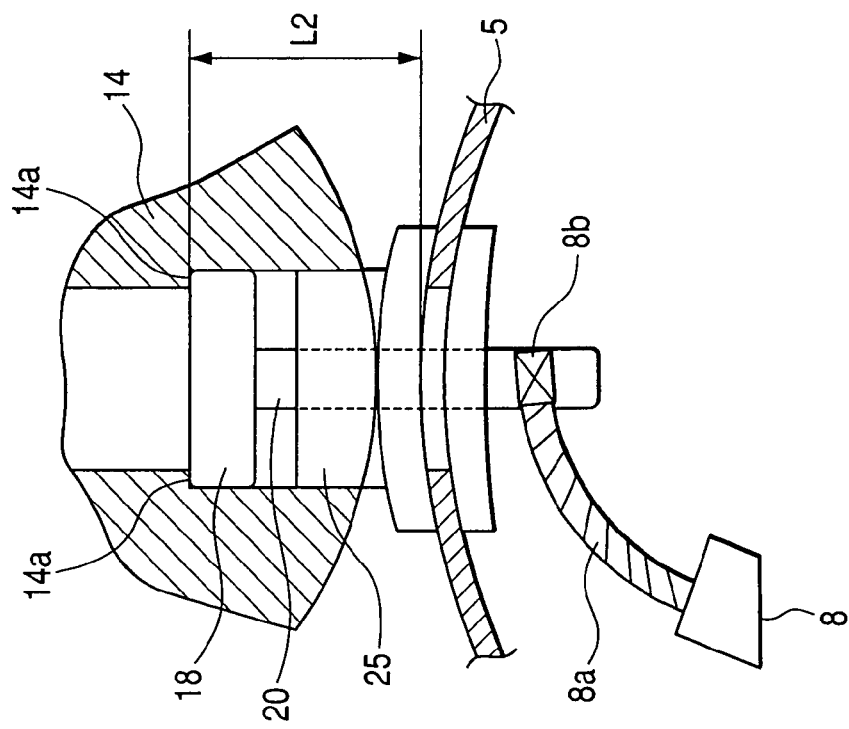
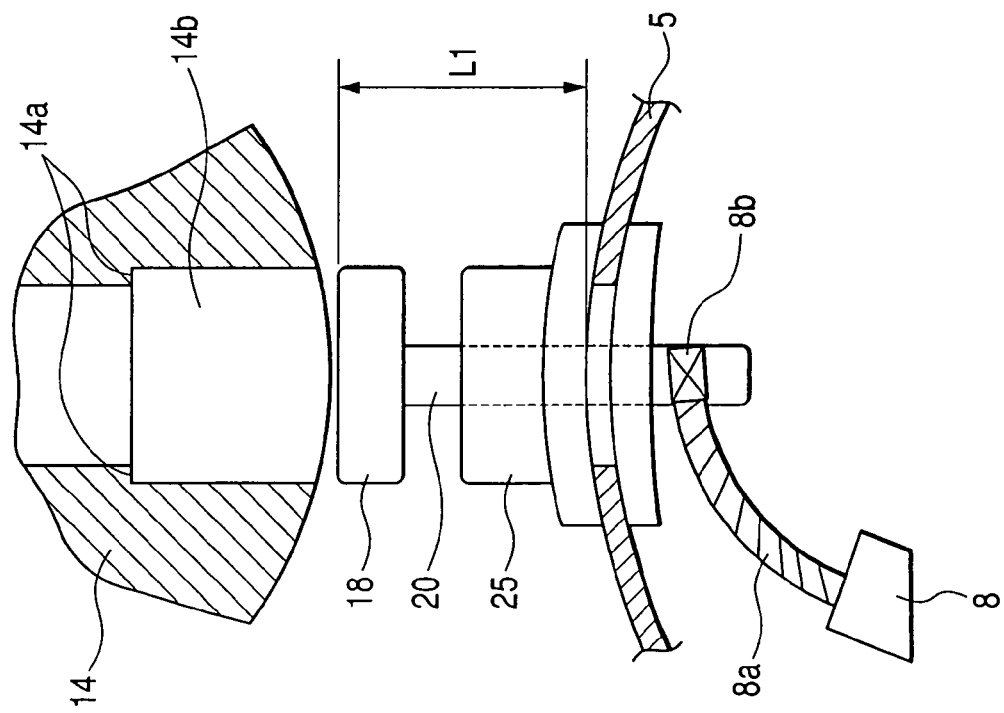

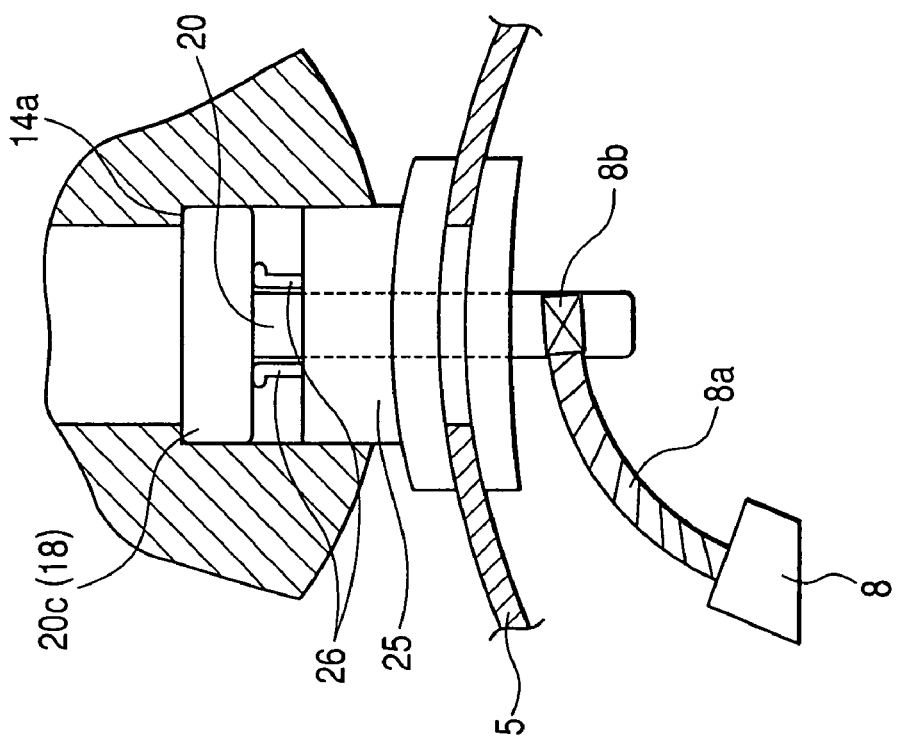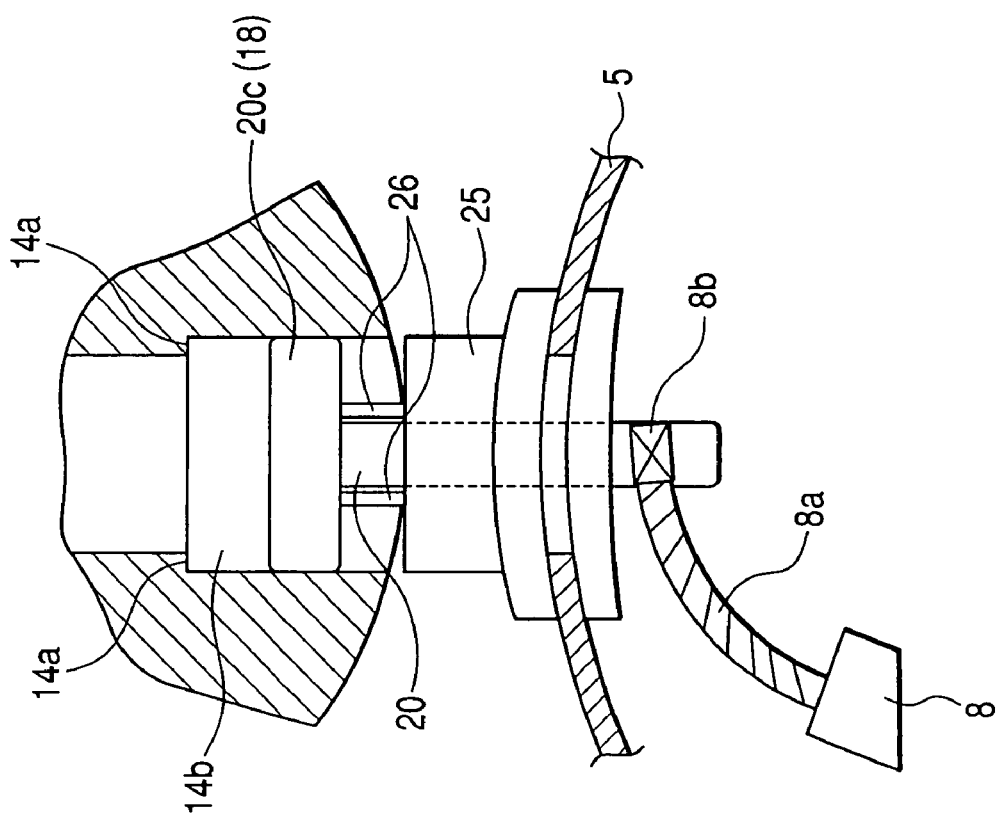

STARTER

CROSS-REFERENCE TO RELATED APPLICATION

This application is related to and claims priority from Japanese Patent Application No. 2006-274168 filed on Oct. 5, 2006, the contents of which are hereby incorporated by reference.

BACKGROUND OF THE INVENTION

1. Field of the invention

The present invention relates to a starter composed mainly of a starter motor or an electric motor and an electromagnetic switch placed close to the electric motor at the outside of the electric motor in a radial direction.

2. Description of the Related Art

A starter capable of starting the operation of an internal combustion engine of a vehicle is equipped with an electromagnetic switch for opening and closing a main contact which is placed in a motor circuit. For example, Japanese patent JP-3478211 discloses such a starter.

The electromagnetic switch and the starter motor are electrically connected to a M terminal bolt fixed to a resin cover of the electromagnetic switch through a motor lead wiring. This configuration of such a starter requires a plurality of additional components such as a washer through which the M terminal bolt is fixed to the resin cover, a nut through which the motor lead wire is connected to the M terminal bolt in addition to the M terminal bolt and the motor lead wiring. This increase the number of assembling working steps and also increases the total manufacturing cost of the start.

In order to eliminate such a drawback, the inventors according to the present invention have proposed a technique capable of decreasing the total number of components forming a starter by simplifying its connection-wiring configuration between the electromagnetic switch and the starter motor. Japanese patent application No. JP 2006-195586 discloses such a technique.

In the configuration of the starter disclosed in Japanese patent application No. JP 2006-195586, because a terminal plate is forcedly fixed only by an elastic member after the completion of starter assembling, the position of a motor-side contact is varied. On contacting a movable contact in the starter onto the motor-side contact, it is difficult to keep an adequate contact area between the movable contact and the motor side contact. There is a room for further improvement of the configuration of the starter regarding the positioning between the movable contact and the motor-side contact.

SUMMARY OF THE INVENTION

It is an object of the present invention to provide a starter capable of suppressing the variation of positioning a motor-side contact against a movable contact in order to adequately and stably keep a contact area between those contacts, and the starter has a terminal plate to be attached to a casing of a starter motor, in which one end side of the terminal plate is connected to a positive electrode brush, and the other end side of the terminal plate acts as the motor-side contact which is inserted into the inside of the resin cover of an electromagnetic switch.

To achieve the above purposes, the present invention provides a starter having a starter motor, an electromagnetic switch, an elastic member, and a terminal plate. The starter motor has a motor circuit configured to generate rotation power to be transmitted to an armature on receiving electric power supplied from a battery. The electromagnetic switch has a battery side contact and a motor side contact to be connected to the starter motor and a movable contact to be driven by attraction force of an electromagnetic, placed close to an outside of the starter motor toward a radial direction of the starter motor, has a movable contact configured to open and close a battery side contact and a starter motor side contact through the movable contact. The elastic member of an insulation capability is fixed to a casing accommodating the starter motor. The terminal plate is made of metal attached to the casing through a penetration hole formed in the elastic member. One end part of the terminal plate projects toward the inside of the casing through the penetration hole which is electrically connected to a pig-tail of an positive electrode brush placed at a high voltage side of the armature. The other end part of the terminal plate, acts as the motor side contact, projects toward the outside of the casing through the penetration hole inserted into the inside of a resin cover accommodating the electromagnetic switch. The terminal plate is positioned in the elastic member along an insert direction of the terminal plate inserted in the penetration hole.

According to the configuration of the starter of the present invention, because the terminal plate is positioned in the elastic member fixed to the casing of the starter motor, the terminal plate is fixed to the casing through the elastic member. It is thereby possible to stably place the other end part of the terminal plate inserted in the inside of the resin cover of the electromagnetic switch, namely, the motor side contact without any variation in position. As a result, because the stable and wide contact area between the motor side contact (M contact) and the battery side contact (B contact) can be obtained when the movable contact is contacted to the motor side contact, it is possible to prevent or avoid occurrence of conductive failure between the motor side contact and the battery side contact.

In the starter according to another aspect of the present invention, the terminal plate is positioned in the elastic member by engaging a concave part or a convex part formed the terminal plate with a convex part or a concave part formed in the penetration hole formed in the elastic member. In this configuration of the starter, it is possible to easily position the terminal plate in the elastic member only by engaging the concave/convex part of the terminal plate to the concave/convex part formed in the penetration hole of the elastic member.

In the starter according to another aspect of the present invention, a thick part which is thicker than the penetration part to be inserted in the penetration hole is formed at the other end part of the terminal plate projecting toward the outside of the casing from the penetration hole of the elastic member, and the pig-tail of the positive electrode brush is electrically connected to the one end part of the terminal plate while contacted to the end surface of the elastic member at which one end part of the terminal plate projects, and the terminal plate is positioned in the elastic member by sandwiching the elastic member between the connection part of the pig-tail and the thick part of the terminal plate. In the above configuration, because the elastic member is sandwiched between the thick part of the terminal plate and the connection part of the pig-tail part, the terminal plate does not move toward the elastic member along the insert direction in the penetration hole. As a result, because the terminal plate is fixed to the casing through the elastic member and the variation of the position of the motor side contact is thereby prevented, it is possible to obtain a stable and wide contact area between the movable contact, the motor side contact (M contact), and the battery side contact (B contact) when the movable contact is contacted to the motor side contact and the battery side contact.

In the starter according to another aspect of the present invention, a wide width part which is larger than a width of the inserting part of the terminal plate to be inserted into the penetration hole is formed in the other end part of the terminal plate projecting toward the outside of the casing through the penetration hole of the elastic member, and the pig-tail of the positive electrode brush is electrically connected to the one end part of the terminal plate while contacted to the end surface of the elastic member at which one end part of the terminal plate projects, and the terminal plate is positioned in the elastic member by sandwiching the elastic member between the connection part of the pig-tail and the wide width part of the terminal plate. The above configuration in which the elastic member is sandwiched between the terminal plate and the connection part of the pig-tail can avoid the movement of the terminal plate against the elastic member along the insert direction. As a result, because the variation of the position of the motor side contact can be prevented by fixing the terminal plate to the casing through the elastic member, it is possible to obtain the stable and wide contact area between the movable contact and the motor side contact when the movable contact is contacted to the motor side contact.

In the starter according to another aspect of the present invention, the resin cover has a stopper capable of positioning the terminal plate in the elastic member by contacting a contact part of the terminal plate to the stopper along the insert direction of the terminal plate into the inside of the resin cover. In the configuration of the starter described above, the positioning of the motor side contact, namely, the positioning of the other end part of the terminal plate inserted in the inside of the resin cover is determined by contacting the contact part of the terminal plate to the stopper formed in the resin cover. As a result, because the contact area between the movable contact and the motor side contact is stably obtained, it is possible to prevent or avoid occurrence of the conductive failure between the movable contact and the motor side contact.

In the starter according to another aspect of the present invention, a relationship (1) is satisfied: $L1>L2\ldots(1)$, where a distance from the outer periphery of the terminal plate to the contact part of the terminal plate before the electromagnetic switch is assembled in the starter is $L1$, and a distance from the outer periphery of the casing to the stopper after the electromagnetic switch is assembled in the starter is $L2$.

Under the condition in which the electromagnetic switch is assembled in the starter, because the contact part of the terminal plate is certainly contacted to the stopper formed in the resin cover, it is possible to have a constant position of the motor side contact inserted in the inside of the resin cover.

In the starter according to another aspect of the present invention, a wide width part larger than a width of the inserting part of the terminal plate inserted into the penetration hole is formed in the other end part of the terminal plate projecting toward the outside of the casing through the penetration hole of the elastic member, and an elastic body, formed in one body with or independently formed from the elastic member, is placed between the wide width part of the terminal plate and the end surface of the elastic member at which the other end part of the terminal plate projects. The relationship (1) is satisfied by elastic force accumulated in the elastic body placed between the end surface of the elastic member and the wide width part of the terminal plate under the condition in which the electromagnetic switch is assembled in the starter. In this configuration of the starter described above, because the terminal plate is pushed toward the switch side (toward the opposite side of the elastic member) by the repulsive force (or elastic force) accumulated in the elastic body, it is possible to position the terminal plate by contacting the contact part of the terminal plate to the stopper formed in the resin cover. As a result, it is possible to have a constant position of the motor side contact to be inserted in the inside of the resin cover.

BRIEF DESCRIPTION OF THE DRAWINGS

A preferred, non-limiting embodiment of the present invention will be described by way of example with reference to the accompanying drawings, in which:

FIG. 3A is a side view of the positioning mechanism for positioning the M terminal plate in the grommet in the starter according to a second embodiment of the present invention;

FIG. 3B is a sectional view along A-A line shown in FIG. 3A;

FIG. 5A is a sectional view of the positioning mechanism for positioning the M terminal plate in a resin cover in the starter before an electromagnetic switch is assembled in the starter according to a fourth embodiment of the present invention;

FIG. 5B is a sectional view of the positioning mechanism for positioning the M terminal plate in the grommet in the starter after assembling the electromagnetic switch in the starter according to the fourth embodiment of the present invention;

FIG. 6A is a sectional view of the positioning mechanism for positioning the M terminal plate in the grommet and the resin cover in the starter before the electromagnetic switch is assembled in the starter according to a fifth embodiment of the present invention; and FIG. 6B is a sectional view of the positioning mechanism for positioning the M terminal plate in the grommet and the resin cover in the starter after assembling the electromagnetic switch in the starter according to the fifth embodiment of the present invention.

DETAILED DESCRIPTION OF THE PREFERRED EMBODIMENTS

Figure 1:
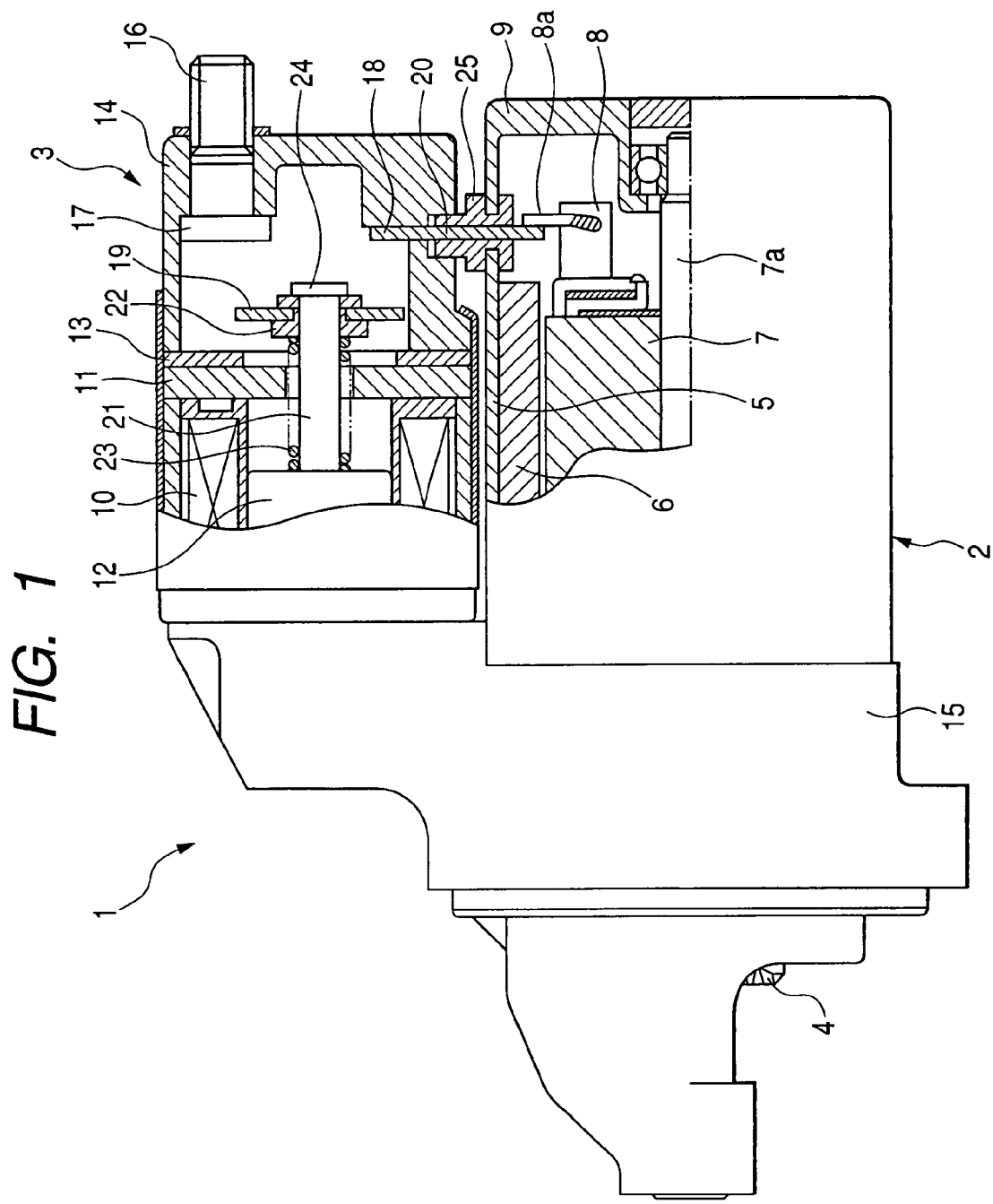
FIG. 1 is a schematic perspective diagram showing the entire configuration of a starter according to the present invention, in particular, showing a cross section of main components of the starter.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a starter 1 according to a first embodiment of the present invention with reference to FIG. 1 and FIG. 2.

Figure 2:
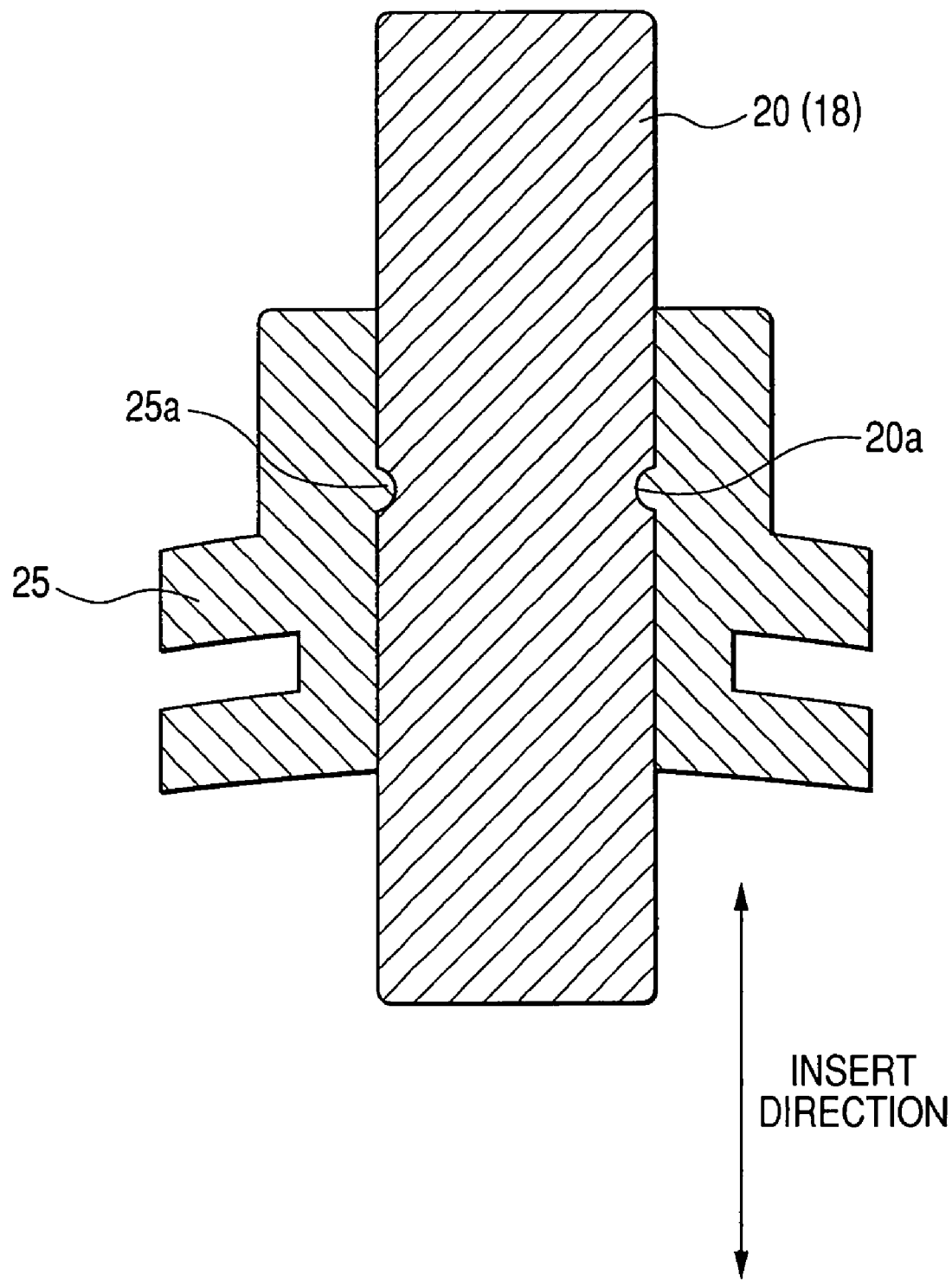
FIG. 2 is a cross sectional view of a positioning mechanism for positioning a M terminal plate in a grommet in the starter according to a first embodiment of the present invention.

FIG. 1 is a schematic perspective diagram showing an entire configuration of the starter 1 according to the present invention. In particular, FIG. 1 shows a cross section of main components of the starter 1. FIG. 2 is a cross sectional view of a positioning mechanism for positioning a M terminal plate 20 in a grommet 25 in the starter 1 according to the first embodiment.

The starter 1 has a starter motor 2, an electromagnetic switch 3 for opening/closing a main contact placed in a motor circuit of the starter motor 2, a pinion gear 4 rotating on-receiving a drive torque transmitted form the starter motor 2, and the like. The operation and configuration of the main contact will be explained in detail later. On engaging the pinion gear 4 to a link gear (not shown), the operation of an internal combustion engine (not shown) of a vehicle is started by transmitting the drive torque of the starter motor 2 to the link gear through the pinion gear 4. This operation is widely well known.

The starter motor 2 has a cylindrical yoke 5 forming a magnet circuit, a permanent magnet 6 generating a magnetic field in the inner periphery of the cylindrical yoke 5, an armature 7 placed in the inner periphery of the permanent magnet 6, a positive electrode brush 8 through which a battery (not shown) supplies a current into the armature 7, an end frame 9 covering an opening part of the yoke 5 at a rear part thereof, and the like.

The electromagnetic switch 3 has a magnet coil 10 forming an electromagnet, a stator core (or a stationary iron core) 11 magnetized by a current flowing in the electromagnet coil 10, a movable plunger 12 moving along an inner periphery of the electromagnet coil 10 in the stator core 11, a resin cover assembled with the stator core 11 through a packing 13, and the like. The electromagnetic switch 3 opens and closes the main contact and pushes a pinion gear 4 toward an opposite direction of the motor 2 (to the left direction in FIG. 1). The electromagnetic switch 3 is placed near the outside of the radial direction of the motor 2. An operation axis of the plunger 12 (to the left direction in FIG. 1) is placed in parallel to an armature axis 7a of the armature 7 in the starter motor 2. Both the electromagnetic switch 3 and the starter motor 2 are fixed to a front housing 15.

The main contact is composed mainly of a battery side contact (hereinafter, referred to as "the B contact 17") connected to a battery of the motor circuit through a terminal bolt 16, a motor side contact (hereinafter, referred to as "the M contact 18") connected to the positive electrode brush 8 of the starter motor 2, and a movable contact 19 for opening and closing both the B contact 17 and the M contact 18. The single terminal bolt 16 is fixed to a resin cover 14 by a mold fixing structure. A front part of the terminal bolt 16 at which a screw part is formed projects from the resin cover toward the axis direction. A terminal of a battery cable (not shown) connected between a on-vehicle battery mounted on a vehicle and the starter 1 is connected to the terminal bolt 16. The terminal of the battery cable is fastened to a screw part of the terminal bolt 16 by a nut (not shown).

The B contact 17 and a head part of the terminal bolt 16 placed in the inside of the resin cover 14 are assembled in one body.

The M contact 18 is formed by a terminal plate (hereinafter, referred to as "a motor terminal plate 20" or "a M terminal plate 20") made of metal, for example, made of copper.

As shown in FIG. 1, the movable contact 19 is slidably attached to an end part of a shaft 21, fixed to the plunger 12, through an insulation member 22 and forcedly pushed toward the front direction (toward the right direction in FIG. 1) of the shaft 21 by a contact pressing spring 23. The movable contact 19 is fixed to the shaft 21 while contacting the washer 24 fixed to the front part of the shaft 21.

Next, a description will now be given of the M terminal plate 20 in the starter 1 according to the first embodiment of the present invention.

The M terminal plate 20 is inserted into a slit-like penetration hole formed in a grommet (or an elastic member) 25 made of resin. The M terminal plate 20 is attached to the yoke 5 of the starter motor 2 through the grommet 25. It is possible to attach the grommet 25 to the end frame 9.

A pig-tail 8a of the positive electrode brush 8 is electrically connected to one end part of the M terminal plate 20 which projects toward the inside of the yoke 5 through the penetration hole. The other end part of the M terminal plate 20 projecting toward the outside of the yoke 5 through the penetration hole formed in the grommet 25 is inserted into the inside of the resin cover 14 in order to form the M contact 18 of the M terminal plate 20.

Slit-like insert grooves are formed in the side wall of the resin cover 14 in the radial direction close to the outer periphery of the yoke 5. The other end part of the M terminal plate 20 is inserted into the inside of the resin cover 14 through the slit-like insert grooves.

The M terminal plate 20 is positioned along the insert direction in the grommet 25. In a concrete example, as shown in FIG. 2, the positioning of the M terminal plate 20 in the grommet 25 (in the vertical direction shown in FIG. 2) is determined by engaging a concave part (or a convex part) 20a formed in the M terminal plate 20 and a convex part (or a concave part) 20a formed in the inserting hole of the grommet 25 together.

Next, a description will now be given of the electromagnetic switch 3 in the starter 1 according to the first embodiment of the present invention.

On supplying a current into the electromagnet coil 10 by turning on a start switch (not shown), the electromagnet coil 10 is activated and the stator core 11 is magnetized. The attraction force is thereby generated between the stator core 11 and the movable plunger 12 which are faced to each other in the axis direction of the electromagnetic switch 10. The movable plunger 12 moves toward the stator core 11 side (toward the right direction in FIG. 1) while pushing and compressing a return spring (not shown). The movement or motion of the plunger 12 pushes the shaft 21 fixed to the movable plunger 12, and the movable contact 19 is thereby contacted onto both the B contact 17 and the M contact 18. On transmitting the compressed load of the contact press spring 23 generated by the movement of the movable plunger 12 to the movable contact 19, the movable contact 19 is forcedly pushed to both the B contact 17 and the M contact 18, so that the main contact is closed and the electric power is supplied from the on-vehicle battery (omitted from the drawings) to the starter motor 2 in the starter 1.

After the starting of the operation of the internal combustion engine, the supply of the electric power is halted by off-operation of the start switch, and the electromagnet coil 10 does not generate the electromagnet field and the attraction force of the electromagnet coil 10 is thereby disappeared, and the movable plunger 12 is forcedly returned toward the opposite direction of the stator core 11 (toward the left direction shown in FIG. 1) by the return spring (not shown). The movable contact 19 is separated from the B contact 17 and the M contact 18, and the main contact is thereby open, and the electric supply from the on-vehicle battery to the motor 2 is halted.

Effects of the Starter 1 According to the First Embodiment

The starter 1 according to the first embodiment has the M terminal plate 20 attached to the yoke 5 of the motor 2 through the grommet 25. The pig-tail 8a of the positive electrode brush 8 is electrically connected to one end of the M terminal plate 20, and the other end of the M terminal plate 20 is inserted into the inside of the resin cover 14 of the electromagnetic switch 3 so as to form the M terminal 18. This configuration of the starter 1 according to the first embodiment can decreases the total number of components forming the starter because the wiring connection structure between the electromagnetic switch 3 and the starter motor 2 can be simplified when compared with that of the conventional starter. In a concrete example, the configuration of the starter 1 according to the first embodiment can eliminate various components such as a M terminal bolt, a motor lead wire, a washer, a nut. This configuration can decrease the manufacturing cost of the starter 1 and provides a light-weight starter with a compact size.

The movement of the M terminal plate 20 toward the switch side and the starter motor side is limited by positioning it along the insert direction in the grommet 25. That is, the M terminal plate 20 is fixed to the yoke 5 through the grommet 25. This enables the other end part of the M terminal plate 20 inserted into the inside of the resin cover 14, namely enables the position of the M contact 18 to be stable without shifting. As a result, on contacting the movable contact 19 onto the M contact 18, the contact area between the movable contact 19 and the M contact 19 can be thereby increased. The configuration can improve the connection reliability of the contact area and prevent or avoid the occurrence of conductive failure or contact failure between the movable contact 19 and M contact 19.

Second Embodiment

A description will be given of the starter according to the second embodiment of the present invention with reference to FIG. 3A and FIG. 3B.

FIG. 3A is a side view of the positioning mechanism for positioning the M terminal plate in the grommet in the starter according to the second embodiment. FIG. 3B is a sectional view along A-A line shown in FIG. 3A.

The M terminal plate 20 in the starter 1 according to the second embodiment of the present invention has a thick part 20b at the other end side where the M contact 18 is formed. As shown in FIG. 3B, the thick part 20b is thicker than a thickness of the inserting part of the M terminal plate 20. A step part between the thick part 20b and the inserting part is contacted to the upper surface of the grommet 25 so as to pass the M terminal plate 20 shown in FIG. 3B toward the bottom direction shown in FIG. 3B through the penetration hole.

The pig-tail 8a of the positive electrode brush 8 is fixed to one end part of the M terminal plate 20 (by welding, for example) while contacting the lower end surface of the grommet 25 at which one end part of the M terminal plate projects after inserting the M terminal plate 20 into the penetration hole of the grommet 25.

As shown in FIG. 3A, in the configuration of the starter 1 described above, the grommet 25 is inserted between a joint part 8b of the pig-tail 8a and the thick part 20b of the M terminal plate 20, the M terminal plate 20 is fixedly positioned without moving in the grommet 25 toward the insert direction (toward the vertical direction in FIG. 3B). As a result, because the M terminal plate 20 is fixed to the yoke 5 through the grommet 25, it is thereby possible to prevent the variation of positioning the M terminal plate 20 inserted into the inside of the resin cover 14 of the electromagnetic switch and possible to keep the adequate contact area between the movable contact 19 and the M terminal plate 20.

Third Embodiment

A description will be given of the starter according to the third embodiment of the present invention with reference to FIG. 4.

Figure 4:
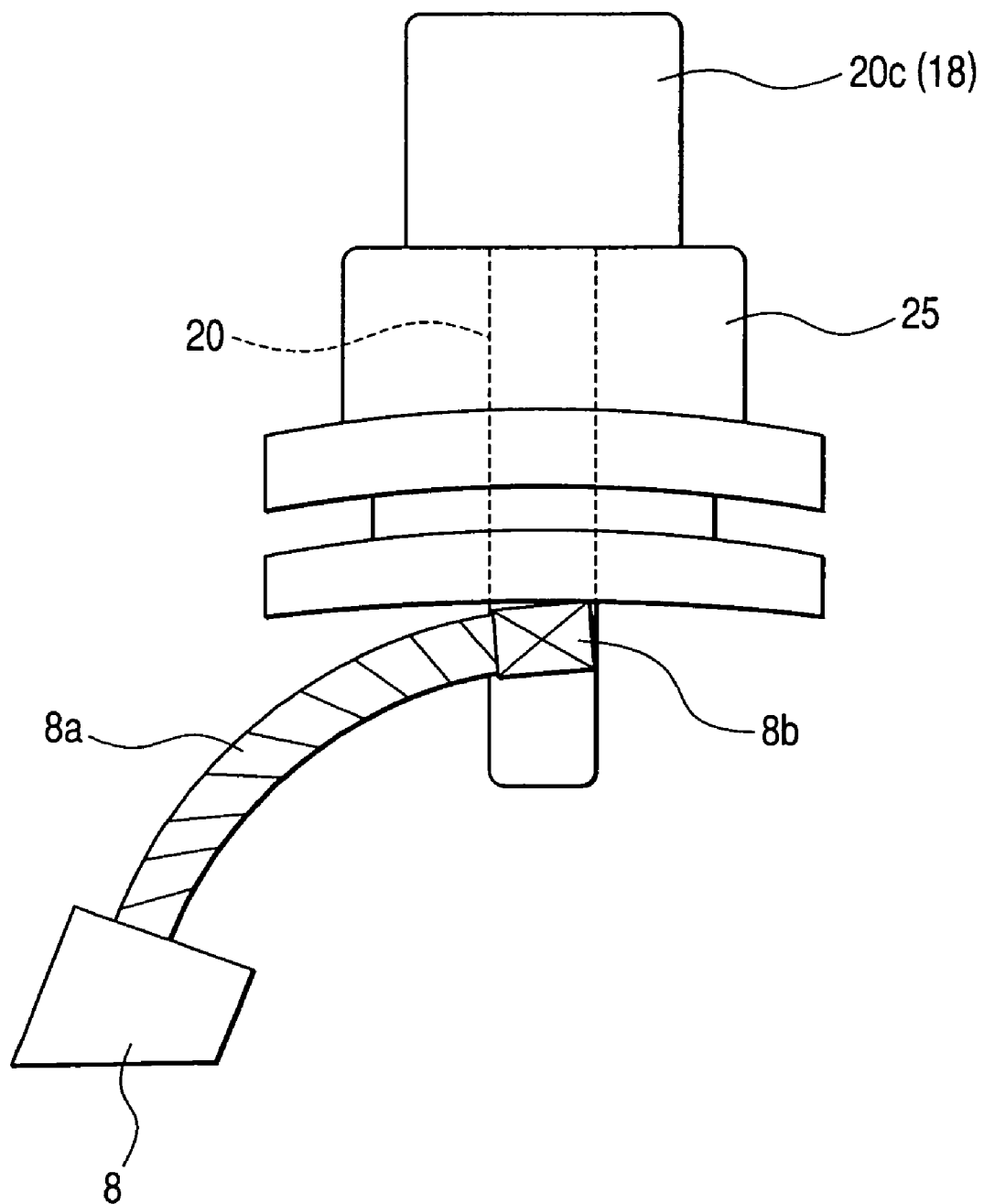
FIG. 4 is a side view of the positioning mechanism for positioning the M terminal plate in the grommet in the starter according to a third embodiment of the present invention.

FIG. 4 is a side view of the positioning mechanism for positioning the M terminal plate 20 in the grommet 25 in the starter according to the third embodiment.

The M terminal plate 20 in the starter 1 according to the third embodiment has a wide width part 20c at the other end part of the M terminal plate 20 where the M contact 18 is formed. As shown in FIG. 4, the wide width part 20c is larger than a width (toward the horizontal direction in FIG. 4) of the inserting part to be inserted into the penetration hole. The step part formed between the wide width part 20c and the inserting part is contacted to the upper end surface of the grommet 25. This configuration can prevent the M terminal plate from falling down toward the bottom in FIG. 4 through the penetration hole.

The pig-tail 8a of the positive electrode brush 8 is fixed to one end part of the M terminal plate 20 (by welding, for example) while contacting the lower end surface of the grommet 25 at which one end part of the M terminal plate projects after inserting the M terminal plate 20 into the penetration hole of the grommet 25.

As shown in FIG. 4, in the configuration of the starter according to the third embodiment described above, the grommet 25 is sandwiched between the joint part 8b of the pig-tail 8a connected to the M terminal plate 20 and the wide width part 20c of the M terminal plate 20, the M terminal plate 20 is fixedly positioned without moving in the grommet 25 along the insert direction (along the vertical direction in FIG. 3B). As a result, because the M terminal plate 20 is fixed to the yoke 5 through the grommet 25, it is thereby possible to prevent the variation of positioning the M terminal plate 20 inserted in the inside area of the resin cover 14 of the electromagnetic switch and possible to keep the adequate contact area between the movable contact 19 and the M terminal plate 20.

Further, having a large width part at the other end side of the M terminal plate 20 at which the M contact 18 is formed can keep a large contact area between the M contact 18 and the movable contact 19.

Fourth Embodiment

A description will be given of the starter according to the fourth embodiment of the present invention with reference to FIG. 5A and FIG. 5B.

FIG. 5A is a sectional view of the positioning mechanism for positioning the M terminal plate in the resin cover in the starter before an electromagnetic switch is assembled according to the fourth embodiment. FIG. 5B is a sectional view of the positioning mechanism for positioning the M terminal plate 20 in the grommet 25 and the resin cover 14 in the starter after the electromagnetic switch 3 is assembled according to the fourth embodiment.

In the positioning mechanism for the starter according to the forth embodiment, a stopper 14a is formed in the resin cover 14 of the electromagnetic switch 3, and the stopper 14a serves as a member of positioning the M terminal plate 20 in the grommet 25.

As shown in FIG. 5A, an insert groove 14b is formed in the resin cover 14, into which the other end part of the M terminal plate 20 is inserted. The stopper 14a is formed in the insert groove 14b.

Similar to the configuration of the third embodiment shown in FIG. 4, the width of the other end part of the M terminal plate 20 where the M contact 18 is formed is larger than that of the inserting part to be inserted into the grommet 25 in order to adequately keep a large contact area between the M contact 18 and the movable contact 19.

As shown in FIG. 5B, both the front corners of the other end part of the M terminal plate 20 to be inserted into the insert groove 14b of the resin cover 14 are contacted to the stopper 14a formed in the resin cover 14 in order to perform the positioning of the M terminal plate 20.

Before assembling the electromagnetic switch 3 and after attaching the M terminal plate 20 to the yoke 5 through the grommet 25, the following relationship (1) is satisfied or established in the starter according to the fourth embodiment.

$$L1 > L2 \tag{1},$$

where a distance from the outer periphery of the yoke 5 to the front end part of the M terminal plate 20 is L1 (see FIG. 5A), and a distance from the outer periphery of the yoke 5 to the stopper 14a formed in the resin cover 14 after the electromagnetic switch 3 is assembled is L2 (see FIG. 5B).

Because the front corner parts of the M terminal plate 20 are certainly contacted to the stopper 14a formed in the resin cover 14 under the condition that the electromagnetic switch 3 has been assembled in the starter, it is possible to accurately place the M terminal plate 20 in the grommet 25 and the resin cover 14. This configuration makes it possible to prevent occurrence of conductive failure between the movable contact 19 and the M contact 18 because the contact area between those contacts 18 and 19 is stable.

Fifth Embodiment

A description will be given of the starter according to the fifth embodiment of the present invention with reference to FIG. 6A and FIG. 6B.

FIG. 6A is a sectional view of the positioning mechanism for positioning the M terminal plate in the grommet 25 and the resin cover 14 in the starter before the electromagnetic switch is assembled according to the fifth embodiment. FIG. 6B is a sectional view of the positioning mechanism for positioning the M terminal plate in the grommet 25 and the resin cover 14 in the starter after the electromagnetic switch is assembled according to the fifth embodiment.

Similar to the fourth embodiment, in the positioning mechanism for the M terminal plate according to the fifth embodiment, the stopper 14a is formed in the resin cover 14 for the electromagnetic switch 3, and the positioning for the M terminal plate 20 is performed by using the stopper 14a. The positioning mechanism according to the fifth embodiment has a pressing means capable of preventing the movement of the M terminal plate 20 toward the starter motor side.

The pressing means is an elastic body 26 which can be assembled with the grommet 25 in one body or assembled in separation from the grommet 25. The elastic body 26 as the pressing means is formed between a wide width part 20c in the M terminal plate 20 and the upper end surface of the grommet 25, as shown in FIG. 6A. FIG. 6A shows the elastic body 26 before the electromagnetic switch 3 is assembled, that is, outside force is not supplied to the elastic body 16.

FIG. 6B shows the positioning mechanism according to the fifth embodiment after the electromagnetic switch 3 has been assembled in the starter, in which the other end side of the M terminal plate 20 is inserted into the insert groove 14b and the front corner parts of the wide width part 20c (serving as the M contact 18) are contacted to the stopper 14a, elastic force is accumulated in the elastic body 26 placed between the wide width part 20c of the M terminal plate 20 and the upper end surface of the grommet 25, and the elastic body 26 is thereby deformed.

Because the M terminal plate 20 is thereby pushed toward the starter motor side (toward the opposite direction of the grommet 25, namely, toward the bottom side in FIG. 6B) by the elastic force (as a repulsive force) accumulated in the elastic body 26, this can prevent the motion of the M terminal plate 20 toward the starter motor side (the direction toward the bottom side in FIG. 6B). That is, the movement of the M terminal plate 20 toward the electromagnetic switch 3 side is limited by the presence of the stopper 14a, and the movement of the M terminal plate 20 toward the starter motor side (toward the bottom side direction in FIG. 6B) is obstructed or stopped by the elastic force (as a repulsive force) accumulated in the elastic body 26, it is thereby possible to completely fix the position of the M terminal plate 20 under the condition that the M terminal plate 20 is positioned by the stopper 14a. As a result, because the adequate contact area between the movable contact 19 and the M contact 18 is stably obtained in addition to satisfying the relation L1>L2 which has been explained in the fourth embodiment, it is possible to prevent the occurrence of conductive failure between the movable contact 19, the movable contact 19, and the M contact 18.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A starter comprising:
   a starter motor having a motor circuit configured to generate rotation power to be transmitted to an armature on receiving electric power supplied from a battery;
   an electromagnetic switch having a battery side contact and a motor side contact to be connected to the starter motor and a movable contact to be driven by attraction force of an electromagnet, placed close to an outside of the starter motor toward a radial direction of the starter motor, having a movable contact configured to open and close to a battery side contact and a starter motor side contact through the movable contact,
   an elastic member of an insulation capability fixed to a casing accommodating the starter motor; and
   a terminal plate made of metal positioned and fixed to the casing through a penetration hole formed in the elastic member, one end part of the terminal plate projecting toward an inside of the casing through the penetration hole being directly connected to and contacting a pig-tail of a positive electrode brush placed at a high voltage side of the armature, and an other end part of the terminal plate, acting as the motor side contact, projecting toward an outside of the casing through the penetration hole inserted into an inside of a resin cover accommodating the electromagnetic switch, and the terminal plate being positioned in the penetration hole of the elastic member along an insert direction of the terminal plate, the terminal plate being positioned in the elastic member by engaging a concave part or a convex part formed in the terminal plate with a convex part or a concave part formed in the penetration hole formed in the elastic member.

2. A starter comprising:

a starter motor having a motor circuit configured to generate rotation power to be transmitted to an armature on receiving electric power supplied from a battery;

an electromagnetic switch having a battery side contact and a motor side contact to be connected to the starter motor and a movable contact to be driven by attraction force of an electromagnet, placed close to an outside of the starter motor toward a radial direction of the starter motor, having a movable contact configured to open and close to a battery side contact and a starter motor side contact through the movable contact, an elastic member of an insulation capability fixed to a casing accommodating the starter motor; and a terminal plate made of metal positioned and fixed to the casing through a penetration hole formed in the elastic member, one end part of the terminal plate projecting toward an inside of the casing through the penetration hole being directly connected to and contacting a pig-tail of a positive electrode brush placed at a high voltage side of the armature, and an other end part of the terminal plate, acting as the motor side contact, projecting toward an outside of the casing through the penetration hole inserted into an inside of a resin cover accommodating the electromagnetic switch, and the terminal plate being positioned in the penetration hole of the elastic member along an insert direction of the terminal plate, wherein a thick part which is thicker than a penetration part inserted in the penetration hole is formed at the other end part of the terminal plate projecting toward the outside of the casing from the penetration hole of the elastic member, and the pig-tail of the positive electrode brush is electrically connected to the one end part of the terminal plate while contacted to an end surface of the elastic member at which one end part of the terminal plate projects, and the terminal plate is positioned in the elastic member by sandwiching the elastic member between a connection part of the pig-tail and the thick part of the terminal plate.

3. A starter comprising:

a starter motor having a motor circuit configured to generate rotation power to be transmitted to an armature on receiving electric power supplied from a battery;

an electromagnetic switch having a battery side contact and a motor side contact to be connected to the starter motor and a movable contact to be driven by attraction force of an electromagnet, placed close to an outside of the starter motor toward a radial direction of the starter motor, having a movable contact configured to open and close to a battery side contact and a starter motor side contact through the movable contact, an elastic member of an insulation capability fixed to a casing accommodating the starter motor; and a terminal plate made of metal positioned and fixed to the casing through a penetration hole formed in the elastic member, one end part of the terminal plate projecting toward an inside of the casing through the penetration hole being directly connected to and contacting a pig-tail of a positive electrode brush placed at a high voltage side of the armature, and an other end part of the terminal plate, acting as the motor side contact, projecting toward an outside of the casing through the penetration hole inserted into an inside of a resin cover accommodating the electromagnetic switch, and the terminal plate being positioned in the penetration hole of the elastic member along an insert direction of the terminal plate, wherein a wide width part which is larger than a width of the inserting part of the terminal plate to be inserted into the penetration hole is formed in the other end part of the terminal plate projecting toward the outside of the casing through the penetration hole of the elastic member, and the pig-tail of the positive electrode brush is electrically connected to the one end part of the terminal plate while contacted to an end surface of the elastic member at which one end part of the terminal plate projects, and the terminal plate is positioned in the elastic member by sandwiching the elastic member between a connection part of the pig-tail and the wide width part of the terminal plate.

4. A starter comprising:

a starter motor having a motor circuit configured to generate rotation power to be transmitted to an armature on receiving electric power supplied from a battery;

an electromagnetic switch having a battery side contact and a motor side contact to be connected to the starter motor and a movable contact to be driven by attraction force of an electromagnet, placed close to an outside of the starter motor toward a radial direction of the starter motor, having a movable contact configured to open and close a battery side contact and a starter motor side contact through the movable contact, an elastic member of an insulation capability fixed to a casing accommodating the starter motor; and a terminal plate made of metal attached to the casing through a penetration hole formed in the elastic member, one end part of the terminal plate projecting toward an inside of the casing through the penetration hole being electrically connected to a pig-tail of an positive electrode brush placed at a high voltage side of the armature, and an other end part of the terminal plate, acting as the motor side contact, projecting toward an outside of the casing through the penetration hole inserted into an inside of a resin cover accommodating the electromagnetic switch, and the resin cover having a stopper capable of positioning the terminal plate in the elastic member by contacting a contact part of the terminal plate to the stopper along the insert direction of the terminal plate into the inside of the resin cover.

5. The starter according to claim 4, wherein a relationship (1) is satisfied:

$$L1 > L2 \qquad (1),$$

where a distance from an outer periphery of the terminal plate to the contact part of the terminal plate before the electromagnetic switch is assembled in the starter is L1, and a distance from an outer periphery of the casing to the stopper after the electromagnetic switch is assembled in the starter is L2.

6. The starter according to claim 5, wherein a wide width part larger than a width of an inserting part of the terminal plate inserted into the penetration hole is formed in the other end part of the terminal plate projecting toward the outside of the casing through the penetration hole of the elastic member, and an elastic body is placed between the wide width part of the terminal plate and the end surface of the elastic member at which the other end part of the terminal plate projects, and the relationship (1) is satisfied by elastic force accumulated in the elastic body placed between the end surface of the elastic member and the wide width part of the terminal plate under the condition in which the electromagnetic switch is assembled in the starter.

7. The starter according to claim 6, wherein the elastic body is formed in one body with or independently formed from the elastic member.

* * * * *